US009990942B1

(12) United States Patent
Liu et al.

(10) Patent No.: US 9,990,942 B1
(45) Date of Patent: Jun. 5, 2018

(54) WRITE HEAD DESIGNS WITH SANDWICH TRAILING SHIELD (STS) FOR HIGH DATA RATE PERPENDICULAR RECORDING

(71) Applicant: Headway Technologies, Inc., Milpitas, CA (US)

(72) Inventors: Yue Liu, Fremont, CA (US); Ying Liu, San Jose, CA (US); Yuhui Tang, Milpitas, CA (US); Jiun-Ting Lee, Sunnyvale, CA (US); Moris Dovek, San Jose, CA (US); Yiming Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days. days.

(21) Appl. No.: 15/357,105

(22) Filed: Nov. 21, 2016

(51) Int. Cl.
*G11B 5/187* (2006.01)
*G11B 5/31* (2006.01)
*G11B 5/127* (2006.01)
G11B 5/39 (2006.01)
G11B 5/008 (2006.01)

(52) U.S. Cl.
CPC .......... *G11B 5/3116* (2013.01); *G11B 5/1278* (2013.01); *G11B 5/187* (2013.01); *G11B 5/00826* (2013.01); *G11B 5/3912* (2013.01)

(58) Field of Classification Search
CPC ... G11B 5/00826; G11B 5/3116; G11B 5/187; G11B 5/3912; G11B 5/11; G11B 5/1278
See application file for complete search history.

(56) References Cited

U.S. PATENT DOCUMENTS

| 9,299,367 B1 * | 3/2016 | Tang | G11B 5/127 |
| 9,361,912 B1 * | 6/2016 | Liu | G11B 5/187 |
| 9,406,317 B1 * | 8/2016 | Tang | G11B 5/3116 |
| 9,466,319 B1 * | 10/2016 | Tang | G11B 5/1278 |
| 9,508,364 B1 * | 11/2016 | Tang | G11B 5/112 |
| 9,626,990 B2 * | 4/2017 | Tang | G11B 5/112 |
| 9,697,855 B1 * | 7/2017 | Liu | G11B 5/6082 |

OTHER PUBLICATIONS

Co-pending U.S. Appl. No. 15/257,314, filed Sep. 6, 2016, "Perpendicular Magnetic Recording (PMR) Write Head with Multiple Layer Trailing Shield," by Ying Liu et al., 42 pgs.

\* cited by examiner

*Primary Examiner* — Brian Miller
(74) *Attorney, Agent, or Firm* — Saile Ackerman LLC; Stephen B. Ackerman

(57) ABSTRACT

A PMR writer is disclosed with an all wrap around (AWA) shield design in which one or more of the leading shield, side shields, and trailing shield (TS) structure (except the hot seed layer) at the air bearing surface (ABS) are comprised of an alloy having a damping parameter $\alpha$ of $\geq 0.04$ to minimize wide area track erasure (WATE). The TS structure comprises two outer magnetic layers with an 8-16 kiloGauss (kG) saturation magnetic moment on each side of a center stack with a lower write gap, a middle hot seed layer having a 19-24 kG saturation magnetic moment, and an upper magnetic layer with a 16-24 kG saturation magnetic moment, and each having a first cross-track width. The hot seed layer, upper TS magnetic layer and an overlying PP3 trailing shield promote improved area density capability (ADC).

25 Claims, 11 Drawing Sheets

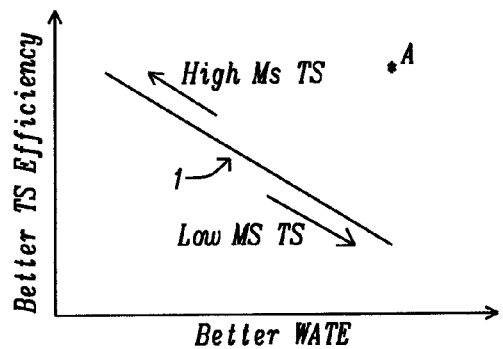
FIG. 1
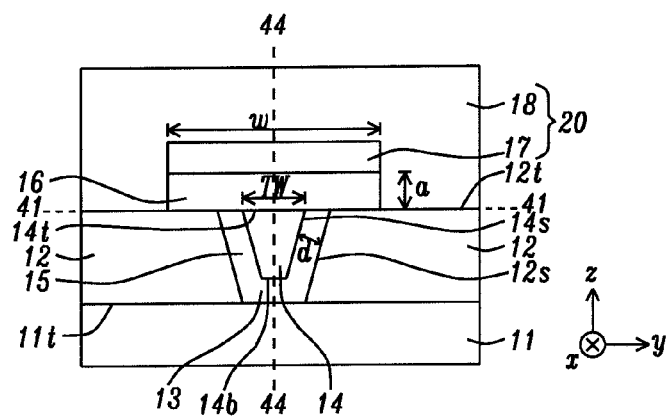
FIG. 2 – Prior Art
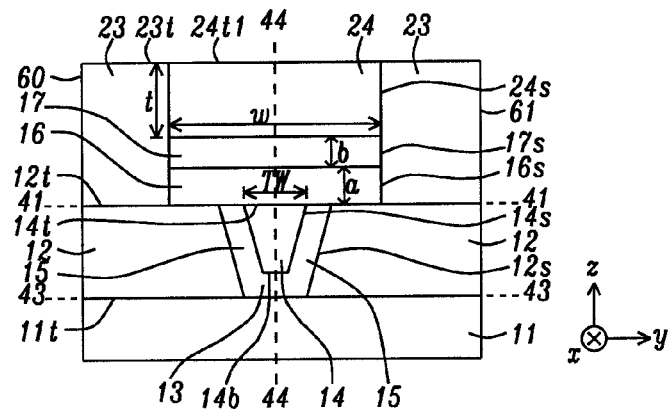
FIG. 3

WRITE HEAD DESIGNS WITH SANDWICH TRAILING SHIELD (STS) FOR HIGH DATA RATE PERPENDICULAR RECORDING

RELATED PATENT APPLICATIONS

This application is related to the following: U.S. Pat. No. 9,466,319; and Ser. No. 15/257,341, filing date Sep. 6, 2016; assigned to a common assignee and herein incorporated by reference in their entirety.

TECHNICAL FIELD

The present disclosure relates to a trailing shield structure in a perpendicular magnetic recording (PMR) write head wherein at least one trailing shield layer above a 19-24 kG hot seed magnetic layer does not have a full width such that an inner portion of the trailing shield above the hot seed magnetic layer is a 16-24 kG layer while an outer portion on each side of the 16-24 kG layer and 19-24 kG hot seed magnetic layer has a lower magnetic saturation (Ms) value of about 8-16 kG in order to promote faster write response while maintaining an acceptable wide adjacent track erasure (WATE).

BACKGROUND

With growing demands for cloud storage and cloud-based network computing applications, high and ultrahigh data rate recording becomes important for near-line and high-end disk drive devices. It is essential to design a PMR writer that can achieve optimum high data rate performance in both area density capability (ADC) and side track erasure (STE) capability.

A PMR write head typically has a main pole layer with a small surface area at an air bearing surface (ABS), and coils that conduct a current and generate a magnetic flux in the main pole layer such that the magnetic flux exits through a write pole tip and enters a magnetic medium (disk) adjacent to the ABS. Magnetic flux is used to write a selected number of bits in the magnetic medium and typically returns to the main pole through a trailing loop comprised of a trailing shield structure with a front side at the ABS and a PP3 trailing shield portion that extends over the write coils and connects to a top surface of the main pole layer above a back gap magnetic connection.

For both conventional (CMR) and shingle magnetic recording (SMR), continuous improvement in storage area density or ADC is required for a PMR writer in order to deliver or pack higher bits per inch (BPI) and higher tracks per inch (TPI). An all wrap around (AWA) shield structure that surrounds the main pole layer in a PMR write head is desirable in that the trailing shield is responsible for improving down track field gradient while side shields and a leading shield improve the cross track field gradient and TPI as well as adjacent track erasure (ATE) performance.

Current PMR writers tend to have the trailing shield (TS) layer in one piece with the same material from center to edge of the trailing shield structure. As depicted in FIG. 1, PMR head performance sits on a line where better TS efficiency (ADC) is typically traded off for better WATE by selecting magnetic materials with different Ms values. With a high Ms material, the magnetic path driving main pole and trailing shield gains efficiency from low reluctance. However, high Ms materials also lead to more field leakage and worse WATE.

Referring to FIG. 2, an ABS view of an AWA shield structure previously disclosed in related U.S. Pat. No. 9,466, 319 is depicted. Main pole 14 is shown with a trailing side 14$t$ having track width TW, and the leading side 14$b$, which contacts lead gap 13 at the ABS. Trailing and leading sides are connected by two sides 14$s$ that each adjoin a side gap 15 with a cross-track width d. Center plane 44-44 bisects the main pole in a down-track direction. Side shields 12 contact a top surface 11$t$ of leading shield 11, and each side shield has a top surface 12$t$ at a plane 41-41 that is orthogonal to the ABS and to the center plane, and includes main pole trailing side 14$t$ at the ABS. Write gap 16 having thickness a, and hot seed (19-24 kG) layer 17, where kG hereinafter is used to denote the saturation magnetic moment in kiloGauss of a layer or material, are sequentially formed on the main pole trailing side and each has a cross-track width w. A full width trailing shield layer 18 made of a 10-19 kG material such as FeNiRe is formed on a top surface of the hot seed layer and along the sides of the write gap and hot seed layer. Trailing shield layer 20 consists of hot seed layer 17 and trailing shield layer 18. A PP3 trailing shield (not shown) is exposed to the ABS, and adjoins a top surface of TS layer 18.

When one or more of the leading shield, side shields, and trailing shield are made of a high damping material, WATE performance is significantly improved without adversely affecting ADC. During dynamic magnetic recording, the high frequency magnetic field generated from the main pole will excite the dynamic magnetization rotation inside all of the surrounding shields. The dynamic magnetization rotations will propagate away from the main pole, and due to complicated domains in the shields including the trailing shield, the resulting magnetization wave may trigger localized magnetic charges that will cause WATE. It is believed that shields made of a high damping magnetic material will significantly reduce the propagation distance of the dynamic magnetization rotation wave due to fast energy dissipation under high damping constant. Hence, localized magnetic charge generation will be minimized in the shield structure thereby reducing the WATE. An improved trailing shield design is needed to escape the tradeoff line in FIG. 1 and approach a point A where both high trailing shield efficiency in terms of improved ADC and clean WATE are realized.

SUMMARY

One objective of the present disclosure is to provide a trailing shield structure for a PMR writer that enables a means of enhancing trailing shield efficiency without compromising WATE.

Another objective of the present disclosure is to provide a method of fabricating an AWA shield design with a trailing shield structure according the first objective that has a production cost similar to that of current AWA shields.

According to a first embodiment, these objectives are achieved with an AWA shield design around a main pole at the ABS. The AWA shield design includes a trailing shield configuration wherein a first 16-24 kG trailing shield layer has a bottom surface contacting a top surface of a hot seed (19-24 kG) layer, and the bottom surface has the same cross-track width as the hot seed layer and underlying write gap. Each side of the first 16-24 kG TS layer adjoins a 8-16 kG trailing shield layer that extends in a down-track direction from a top surface of each side shield to the top surface of the trailing shield structure, and extends in a cross-track direction from the sides of the write gap, hot seed layer, and first 16-24 kG TS layer to a far side of the trailing shield structure. In some embodiments, the sides of the first 16-24 kG TS layer are coplanar with the sides of the write gap and hot seed layer, and are aligned orthogonal to the cross-track direction. In alternative embodiments, the first 16-24 kG TS layer sides are tapered such that a top surface of the first 16-24 kG TS layer has a larger cross-track width than the bottom surface of said layer. A PP3 trailing shield layer has a front side that is recessed from the ABS and contacts the top surface of the first 16-24 kG TS layer. The first 16-24 kG TS layer has a thickness of about 1 micron for optimum thermomechanical properties. Preferably, both of the hot seed layer and first 16-24 kG TS layer extend a first height (h1) from the ABS toward a back end of the PMR write head.

Magnetic flux is generated by driving coils that are proximate to main pole leading and trailing surfaces. When writing one or more bits in a magnetic medium, magnetic flux exits the main pole tip at the ABS. Magnetic flux in the magnetic medium re-enters the PMR writer through the trailing shield structure at the ABS and then passes in a trailing loop through the front end of the PP3 trailing shield to a back end thereof and then to a back gap connection that adjoins a back portion of the main pole layer. The PP3 trailing shield may have an arch (dome) shape or a flat top surface from a down-track cross-sectional view.

In another embodiment, a second 16-24 kG TS layer having a full width is formed at the top surfaces of the 8-16 kG TS layer and the first 16-24 kG TS layer. The first 16-24 kG TS layer thickness is thinned so that the combined thickness of the 16-24 kG TS layers is about 1 micron. This embodiment has the second 16-24 kG TS layer extending to height h1, but enables the height of the hot seed layer and first 16-24 kG TS layer to be substantially reduced to h2 where h1>h2. A front side of the PP3 trailing shield is recessed from the ABS and the front end of the PP3 trailing shield contacts a top surface of the second 16-24 kG TS layer.

According to a third embodiment, the second 16-24 kG TS layer in the second embodiment is omitted and the front side of the PP3 trailing shield is moved to the ABS. The first 16-24 kG TS layer has a thickness of 0.1 to 0.5 micron and a top surface thereof adjoins the PP3 trailing shield from the ABS to height h1.

In some embodiments, one or more of the 8-16 kG TS layer, first and second 16-24 kG TS layers, PP3 trailing shield, side shields, and leading shield are made a high damping magnetic material with a Gilbert damping constant (a) substantially greater than 0.02, and preferably at least 0.04, and more preferably ≥0.05. The high damping magnetic material may be FeNiRe with a Re content between 3 and 15 atomic %. However, other alloys including but not limited to FeCoRe, FeCoNiRe, FeNiM, FeCoM, FeNM, and FeCoNiM where M is one of Os, Ir, Rh, Ti, Ta, V, Cr, W, Mn, Mo, Cu, Zr, Nb, Hf, Ru, Pd, Pt, Ag, and Au may also be employed as the high damping magnetic material. As a result, WATE is considerably reduced compared with designs where each of the trailing shield layers, side shields, and leading shield are made of conventional CoFe, NiFe, CoFeNi, or CoFeN alloys. The hot seed layer is preferably comprised of FeCo, FeCoNi, or NiFe.

According to one method of forming the AWA shield structure, a leading shield and side shield layer are sequentially formed on a substrate. An opening with sidewalls is formed in the side shield layer that exposes a portion of leading shield top surface. Thereafter, a gap layer is conformally deposited on the sidewalls and bottom surface of the opening. Next, the main pole layer is plated to fill the opening, and a first chemical mechanical polish (CMP) process is performed to form a planar top surface of the main pole, side gaps, and the side shields at a first plane that is orthogonal to the ABS and to a center plane that is aligned in a down-track direction and bisects the main pole. The write gap is deposited on the first plane, and then a first photoresist layer is coated and patterned to form sides thereon thereby uncovering outer portions of the write gap. Thereafter, an etch process is employed to remove the uncovered write gap portions and form write gap sides that stop on each side shield at the first plane. An 8-16 kG trailing shield layer is plated on exposed portions of each side shield. Then, the photoresist layer is removed and the hot seed (19-24 kG) layer and first 16-24 kG TS layer are sequentially plated on the write gap. A second CMP process is performed to form top surfaces on the 8-16 kG layer and first 16-24 kG TS layer that are coplanar.

Modifications of the fabrication sequence are disclosed that are used to form alternative embodiments described previously. The overlying layers in the PMR write head are then formed with conventional processes.

BRIEF DESCRIPTION OF THE DRAWINGS

FIG. 1 is a plot showing the trade off between trailing shield (TS) efficiency and WATE when the magnetic saturation (Ms) value is varied in the trailing shield.

FIG. 2 is an ABS view that shows a prior art shield structure wherein the trailing shield is comprised of a hot seed layer on the write gap and an overlying trailing shield that extends from one side of the shield structure to the other side.

FIG. 3 is an ABS view of a first embodiment of a trailing shield (TS) structure according to the present disclosure wherein a 16-24 kG layer is formed only above the hot seed layer while an 8-16 kG layer adjoins the sides of the 16-24 kG layer.

DETAILED DESCRIPTION

Figure 4:
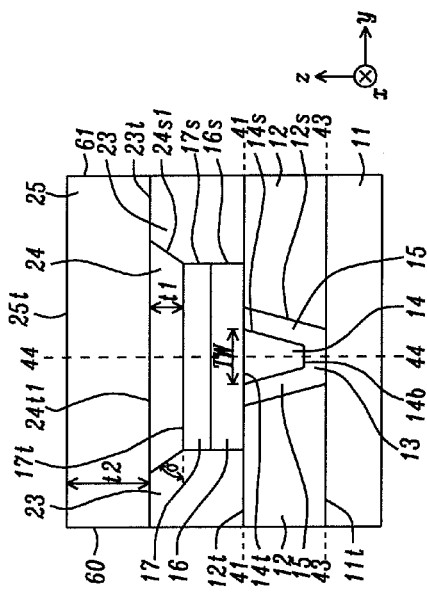
FIG. 4 shows a modification of the trailing shield structure in FIG. 3 wherein the sides of the 16-24 kG layer are not orthogonal with respect to the hot seed layer top surface.

The present disclosure relates to a trailing shield (TS) structure formed above and adjacent to a write gap wherein a center (inner) portion thereof is made of a stack having a lower hot seed layer and an upper high Ms (16-24 kG) layer, and an outer portion is comprised of a low Ms (8-16 kG) material that adjoins the sides of the write gap, hot seed layer, and upper 16-24 kG layer where kG or kiloGauss is hereinafter used to indicate the saturation magnetic moment of a layer or material. A key feature is that the inner portion of the TS structure has a higher Ms than the outer portion in order to promote better ADC while maintaining an acceptable WATE. Moreover, in an AWA shield embodiment, one or more of the leading shield, sides shields, 8-16 kG TS layer, and 16-24 kG TS layer may be made of a material with a Gilbert damping constant ($\alpha$) of at least 0.04, and preferably $\geq 0.05$ in order to minimize WATE while providing improved ADC for advanced HDD devices. The main pole may have one or both of a tapered leading side and tapered trailing side. In the drawings, the y-axis is a cross-track direction, the z-axis is a down-track direction, and the x-axis is in a direction orthogonal to the ABS and towards a back end of the PMR writer. The trailing shield design described herein is compatible with various coil schemes, and is not limited to a specific write head structure or to a particular combined read head/write head configuration.

In related patent application Ser. No. 15/257,341, we disclosed that a full width 8-16 kG trailing shield layer may be formed on the hot seed layer, and below a full width 16-24 kG trailing shield layer to form a trilayer trailing shield structure thereby improving write speed (reduced rise time) without significantly impacting WATE.

Now we have discovered that by further modifying the aforementioned trilayer trailing shield structure to limit the low (8-16 kG) Ms trailing shield layer to outer portions of the TS structure, replacing an inner portion thereof with a 16-24 kG material, and making the back gap connection (BGC) or top yoke (TY) layer with a 16-24 kG material, acceptable WATE is maintained while further improvement in writing response speed and ADC may be realized. Preferably, the outer 8-16 kG trailing shield layer is comprised of a high damping material to optimize WATE performance.

Meanwhile, the hot seed layer and 16-24 kG material in the inner portion and in the PP3 trailing shield provide a low reluctance magnetic path to drive magnetic flux through the trailing shield structure more efficiently, especially at high data rates required in advanced PMR writer designs. Accordingly, ADC is improved.

Referring to FIG. 3, an ABS view of an AWA shield design having a trailing shield structure formed according to a first embodiment of the present disclosure is depicted. The leading shield 11, side shields 12, lead gap 13, and side gaps 15 are retained from the process of record (POR) design previously described with respect to FIG. 2. Furthermore, write gap 16 and hot seed layer 17 having sides 16s, 17s, respectively are formed on the main pole trailing side 14t at the ABS as indicated in the POR design. Note that the write gap and hot seed layer each have a cross-track width w of about 0.2 to 1 micron that is greater than the track width TW, and wherein layers 16, 17 are bisected by center plane 44-44. The leading shield contacts the bottom surface of the lead gap and adjoins the side shields along plane 43-43 which is aligned parallel to plane 41-41 described previously.

A key feature of the present disclosure is that the trailing shield structure above the hot seed layer is limited to a high Ms (16-24 kG) layer 24 while the trailing shield layer 23 adjoining the sides of the write gap, hot seed layer, and high Ms TS layer is a low Ms (8-16 kG) material. In preferred embodiments, the 8-16 kG magnetic layer 23 is a high damping (HD) magnetic material that is an Fe rich alloy such as $Fe_xNi_{100-x}M$ with an x content of $\geq 50$ atomic % and where M is a transition metal with a content between 1 and 15 atomic % in the alloy. In other embodiments, alloys including but not limited to FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au with an M content of 1-15 atomic % may also be employed in the side shields 12, leading shield 11, 8-16 kG TS layer 23, and in 16-24 kG TS layer 24.

Preferably, the aforementioned HD magnetic material has a damping parameter $\alpha$ which is at least 0.04, and more preferably $\geq 0.05$, that is substantially greater than a typical $\alpha$ value of about 0.02 for commonly used alloys such as FeCo, FeNi, and FeCoNi in shield structures. As the M content in the aforementioned alloys increases, $\alpha$ also becomes larger but at the expense of decreasing Ms. Thus, M has an upper limit of about 15 atomic % to prevent the Ms value from dropping below about 8 kG in the side shields, leading shield, and in TS layer 23. M has a y content of at least 1 atomic % to yield a substantial increase in $\alpha$ for a $(Fe_xNi_{100-x})_{100-y}Re_y$ HD layer compared with a $Fe_xNi_{100-x}$ layer, for example. Moreover, the HD magnetic material preferably has a coercivity (Hc) less than 50 Oe. In other embodiments, an Hc value $\geq 50$ Oe may be acceptable.

In the exemplary embodiment in FIG. 3, 16-24 kG trailing shield layer 24 has a top surface 24t1 that is coplanar with the top surface 23t of each 8-16 kG trailing shield layer 23. The 16-24 kG TS layer has a thickness t of about 1 micron in order to optimize thermomechanical properties therein, and has sides 24s that are coplanar with sides 16s, 17s of the write gap and hot seed layer, respectively. There is an 8-16 kG TS layer 23 on each side of the center plane 44-44 so that each TS layer 23 extends from an inner side that coincides with sides 16s, 17s, 24s to a far side at side 60 or 61 of the trailing shield structure. Each TS layer 23 contacts a top surface 12t of a side shield 12 at plane 41-41. In other words, each TS layer 23 has a thickness equivalent to the combined thicknesses (a+b+t) of write gap 16, hot seed layer 17, and 16-24 kG TS layer 24, respectively.

In FIG. 4, an alternative embodiment of the present disclosure is depicted wherein the trailing shield structure from FIG. 3 is retained except for 16-24 kG TS layer 24 where each side 24s1 is formed at an angle σ that is greater than 0 degrees but less than 90 degrees with respect to a plane that includes bottom surface 24b1. As a result, the cross-track width of top surface 24t1 is greater than cross-track width w of bottom surface 24b1 at the ABS. Both embodiments shown in FIG. 3 and FIG. 4 have a so-called sandwich trailing shield (STS) configuration.

Figure 7A:
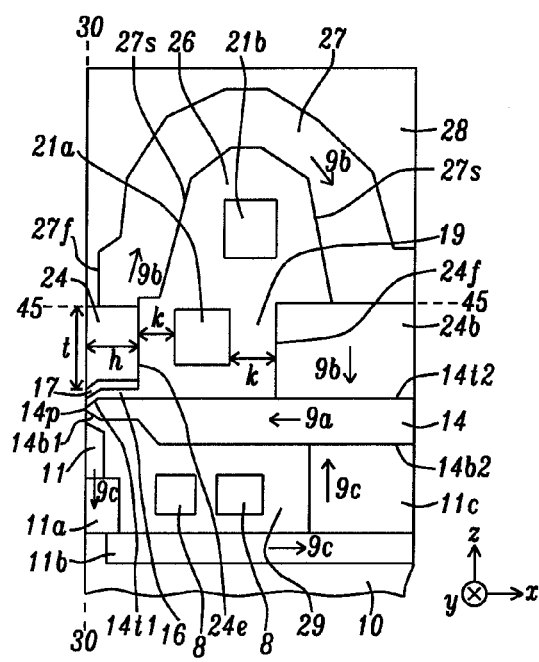
FIGS. 7a-7b are down-track cross-sectional views of embodiments of the shield structure in FIG. 3 or FIG. 4 wherein a PP3 trailing shield is formed on the 16-24 kG layer and has an arch shape.

Referring to FIG. 7a, a down-track cross-sectional perspective is shown along plane 44-44 in FIG. 3 or FIG. 4. According to one embodiment, hot seed layer 17 and 16-24 kG TS layer 24 each extend a first height h of 300-800 nm from the ABS. The 16-24 kG TS layer 24 has a backside 24e, and also has a back portion 24b with front side 24f contacting a main pole trailing side 14t2 that is aligned orthogonal to the ABS 30-30. Back portion 24b is also known as a back gap connection (BGC) layer or top yoke layer. Backside 24e and front side 24f are separated by a dielectric layer 19 which also adjoins a portion of main pole trailing side 14t2 that is not covered by BGC layer 24b. There is a driving coil 21a within the dielectric layer and a gap k of ≥0.2 micron between the driving coil and front side 24f, and between the driving coil and backside 24e to enable a higher degree of reproducibility when fabricating the dielectric gaps with size k in a manufacturing environment. In embodiments where 16-24 kG TS layer 24 is made of a conventional magnetic material or a HD 16-24 kG material, BGC 24b is also comprised of the conventional magnetic material or HD 16-24 kG material.

The write head including main pole 14 is formed on a substructure 10 comprised of magnetic layers and dielectric layers (not shown) as appreciated by those skilled in the art. Above the substructure is a return path layer (RTP) 11b with a front side, which is recessed from the ABS 30-30. The RTP is part of an optional leading loop design where magnetic flux 9c may return from a magnetic medium and enter the leading shield 11 before proceeding through a leading shield connection 11a, the RTP, and a leading loop BGC 11c. Leading shield 11 is shown adjacent to tapered main pole leading side 14b1 that has a front end at the ABS. A leading loop is advantageous for a high density recording (HDR) application as it offers faster write response, better high data rate capability, and enhanced ATE and WATE margins. Preferably, the magnetic layers in the leading loop are comprised of a HD 8-16 kG material with a damping parameter α of ≥0.04, or are made of a conventional 8-16 kG magnetic material.

There are bucking coils 8 formed within an isolation layer 29 between the RTP 11b and the main pole trailing side 14t2. A 1+1+2T coil scheme is depicted that relates to driving coils 21a, 21b, and bucking coils 8, respectively. However, the present disclosure also encompasses other coil designs including well known 1+1T, and 2+2T designs.

Magnetic flux 9a in the main pole exits the main pole tip 14p when writing one or more bits on a magnetic medium (not shown) and returns to the main pole as magnetic flux 9c through a leading loop as mentioned previously, and as magnetic flux 9b through a trailing loop that includes hot seed layer 17, 16-24 kG TS layer 24, PP3 trailing shield 27, and BGC layer 24b. A front side 27f of the PP3 trailing shield is recessed from the ABS and contacts a top surface of the 16-24 kG trailing shield layer at plane 45-45 that is parallel to main pole trailing side 14t2. A back end of the PP3 trailing shield adjoins a top surface of BGC layer 24b at plane 45-45. The PP3 trailing shield may have inner sides 27s that form an arch shape over dielectric layer 26 which surrounds driving coil 21b above plane 45-45. Protection layer 28 covers a top surface of the PP3 trailing shield and extends from the ABS to a back end of the write head. In some embodiments, the PP3 trailing shield may be comprised of a HD 16-24 kG material with a damping parameter α of ≥0.04. In other embodiments, the PP3 trailing shield is made of a conventional 16-24 kG magnetic material.

Figure 7B:
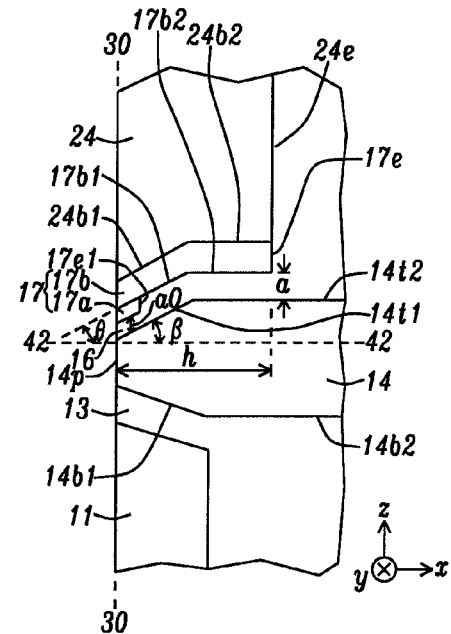

In FIG. 7b, an enlarged view of the trailing shield structure that is proximate to the ABS 30-30 in FIG. 7a is illustrated. Tapered main pole leading side 14b1 has a front end at the ABS and is separated from leading shield 11 by lead gap 13. Hot seed layer 17 is comprised of a larger portion 17b that extends from the ABS to a backside 17e that is coplanar with the 16-24 kG TS layer backside 24e at height h, and a smaller portion 17a adjoining a bottom surface of upper portion 17b from the ABS to a height less than h. Write gap 16 has a down-track thickness a behind backside 17e and between tapered main pole trailing side 14t1 and hot seed layer bottom side 17b1, and between main pole trailing side 14t2 and hot seed layer bottom side 17b2 that extends parallel to main pole trailing side 14t2 and from an end of side 17b1 to height h. Hot seed portion 17a extends a distance of about 30 to 80 nm from the ABS and has a down-track thickness a0. Hot seed layer bottom side 17b1 forms a taper angle θ with plane 42-42 while main pole trailing side 14t1 has a taper angle of β with plane 42-42 that is orthogonal to the ABS and passes through write pole tip 14p. In the exemplary embodiment, both angles β and θ are around 25 degrees. However, in other embodiments, angle θ may be 30-70 degrees while β is maintained at about 25 degrees. The 16-24 kG TS layer 24 has a bottom side 24b1 with a front end at the ABS, and a second bottom side 24b2 from an end of bottom side 24b1 to height h where sides 24b1, 24b2 are aligned substantially parallel to hot seed layer bottom sides 17b1, 17b2, respectively.

According to another embodiment that represents a modification of the PP3 trailing shield in FIG. 7a, the down-track cross-sectional perspective along plane 44-44 in FIG. 3 or FIG. 4 is shown in FIG. 8 where the arch shape in the PP3 trailing shield is replaced by a flat top surface 27t that is parallel to main pole trailing side 14t2 and extends from a front side 27f to a back end 27e of the PP3 trailing shield 27-1 above BGC layer 24b. In this case, the uppermost driving coil 21b, one bucking coil 8, and dielectric layer 26 are omitted to provide a 1 coil turn (1+1T) design. There is a driving coil 21a between backside 24e and front side 24f as in the previous embodiment. Thus, a top surface of BGC layer 24b contacts a back portion of the PP3 trailing shield at plane 45-45, and the BGC layer has a bottom surface that adjoins a portion of main pole trailing side 14t2. Similar to FIG. 7a, BGC layer 24b has essentially the same thickness t as a front side of the 16-24 kG TS layer 24 at the ABS 30-30. Front side 27f is recessed about 50 to 250 nm from the ABS 30-30. The leading loop structure that includes leading shield 11, leading shield connection 11a, RTP 11b, and leading BGC 11c is retained from the previous embodiment. Furthermore, the trailing loop components including hot seed layer 17, 16-24 kG TS layer 24, and BGC/TY layer 24b are retained from the previous embodiment while PP3 trailing shield 27-1 replaces the arched PP3 trailing shield 27.

In the exemplary embodiments described herein, there is a leading loop for magnetic flux 9c to return from a magnetic medium to the main pole layer. According to the embodiments depicted in FIG. 7a and FIG. 8a, the leading loop has a leading shield connection (LSC) layer 11a exposed at the ABS 30-30. However, the present disclosure anticipates the leading loop may alternatively have one of the following three configurations depicted in FIG. 8b, FIG. 8c, and in a non-DWS (double write shield) design (not shown).

Figure 8A:
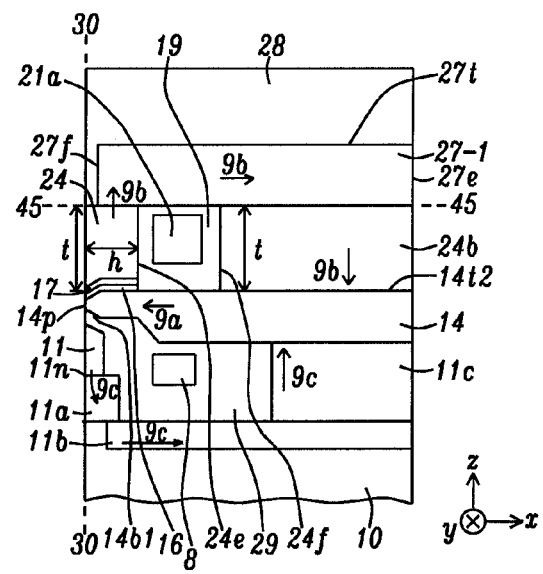
FIGS. 8a-8c are down-track cross-sectional views of the shield structure in FIG. 3 or FIG. 4 wherein the PP3 trailing shield has a flat top surface and the leading loop for magnetic flux return to the main pole has various embodiments.
Figure 8B:
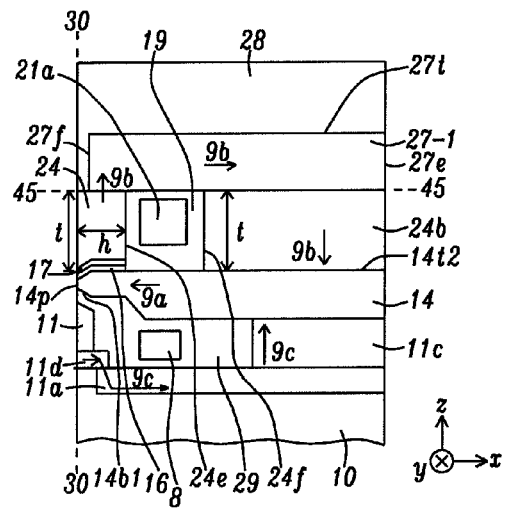
Figure 8C:
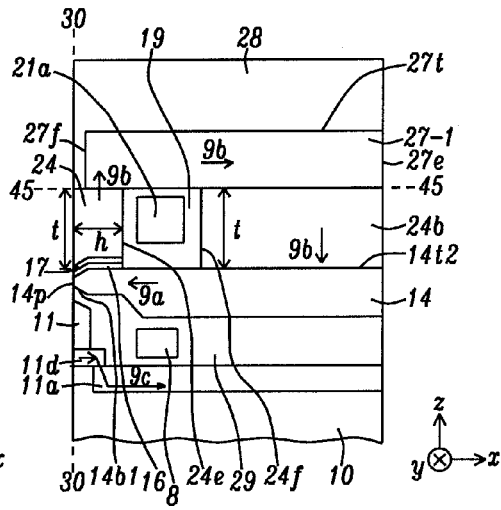

As depicted in FIG. 8b, LSC layer 11a is recessed from the ABS and is connected to leading shield 11 through a leading shield bridge 11d with a thickness of 0.3-0.5 micron at the ABS. Here, the LSC layer replaces the RTP in FIG. 8a and adjoins leading BGC 11c to complete the leading loop. In yet another embodiment shown in FIG. 8c, the leading BGC 11c may be omitted such that isolation layer 29 completely separates the main pole 14 and LSC layer 11a. There is also a non-DWS (double write shield) design that retains all of the features in FIG. 8b except both of the LSC layer 11a and leading BGC are omitted from the leading loop. As a result, magnetic flux 9b in the trailing loop pathway is enhanced compared with the DWS design in FIGS. 8a-8b. Moreover, there is sufficient flux 9c retained in the leading shield 11 and leading shield bridge 11d to suppress stray fields in the side shields and leading shield thereby maintaining ATE at a level similar to that for a DWS scheme. It is believed that when a majority of the returning magnetic flux passes through the trailing loop as in the FIG. 8c and non-DWS embodiment, hot seed layer 17 in trailing loop becomes more negative to main pole potential. This condition translates to a better return field at the main pole trailing edge adjoining write gap 16 during writing. Furthermore, the better return field is responsible for improving the field gradient, and improved bit error rate (BER) and ADC are also achieved. In FIGS. 8a-8c, there is an LSC layer that is magnetically connected to a leading side 11n of the leading shield.

Figure 5:
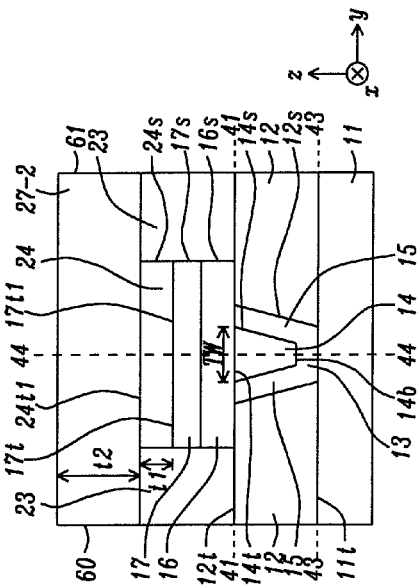
FIG. 5 and FIG. 6a are ABS views showing a modification of the trailing shield structure in FIG. 4 and FIG. 3, respectively, wherein a second 16-24 kG layer having a full width is formed as the uppermost layer in the trailing shield.

The present disclosure also anticipates a so-called funnel trailing shield (FTS) configuration in an AWA shield design as depicted in FIG. 5. In particular, the thickness t of the 16-24 kG TS layer 24 in the STS scheme of FIG. 4 is thinned to a thickness t1 in the range of 0.1 to 0.5 micron while maintaining an angle α of 30 to about 90 degrees where sides 24s1 intersect hot seed layer top surface 17t. In addition, a second 16-24 kG TS layer 25 having thickness t2 is added at top surfaces 24t1 and 23t and forms a full width trailing shield layer between far sides 60, 61. Typically, the full width of the trailing shield structure between the far sides is about 20 to 30 microns. Top surface 25t of the second 16-24 kG TS layer is preferably parallel to plane 41-41. In some embodiments, t2 is greater than t1. Preferably, the combined thickness (t1+t2) equals about 1 micron to provide an acceptable thermomechanical performance in the trailing shield structure. Note that the thickness of the 8-16 kG TS layer 23 is reduced in the FTS configuration compared with the STS scheme. As a result of less volume in TS layer 23, the FTS embodiment favors better TS efficiency over the STS scheme, but with a trade off in less desirable WATE.

Figure 6A:
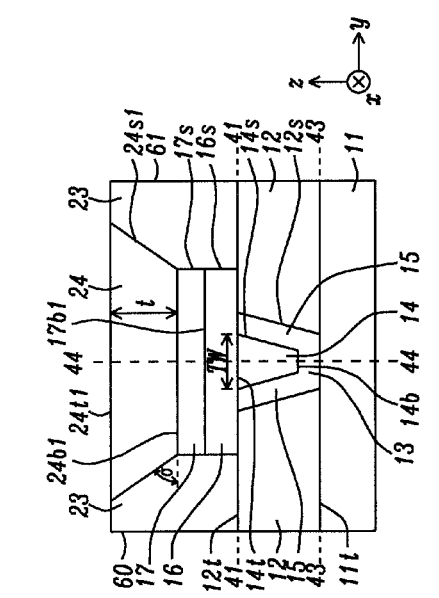
Figure 6B:
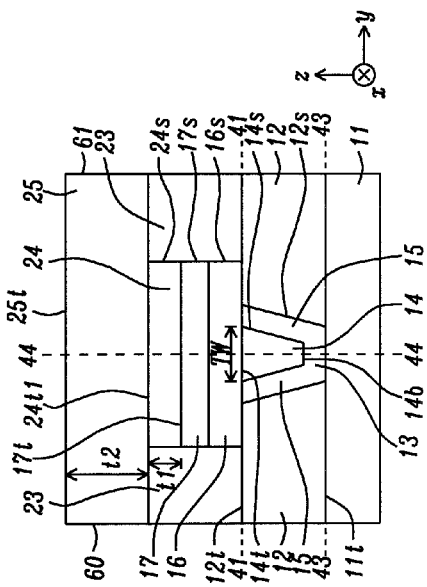
FIG. 6b is an ABS view showing another embodiment of the present disclosure wherein the second 16-24 kG layer in FIG. 6a is part of a PP3 trailing shield.

The aforementioned FTS configuration also comprises an embodiment where sloped sides 24s1 in FIG. 5 are replaced by a vertical side with thickness t1 in FIG. 6a. All other aspects of the trailing shield structure are maintained from FIG. 5. Thus, sides 24s of the 16-24 kG layer 24, hereafter referred to as the first 16-24 kG TS layer, are coplanar with sides 17s of the hot seed layer 17 and with sides 16s of the write gap 16. Furthermore, each of the layers 16, 17, 24 has a cross-track width w as indicated earlier in the STS embodiment shown in FIG. 3.

Figure 9A:
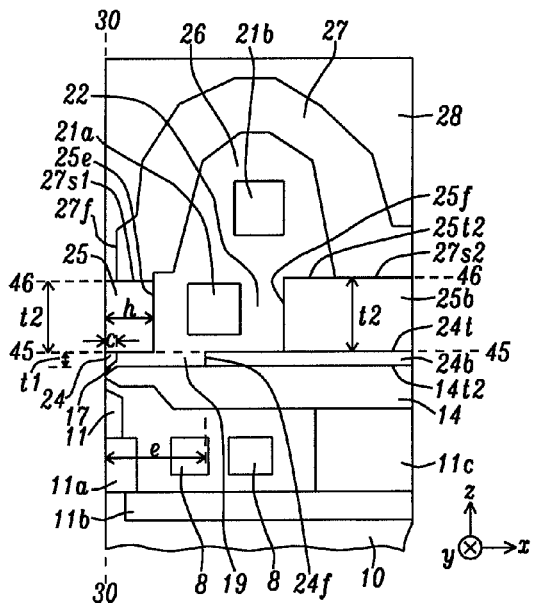
FIG. 9a and FIG. 10 are down-track cross-sectional views of two embodiments of the shield structure in FIG. 5 or FIG. 6a wherein a PP3 trailing shield is formed on a 16-24 kG TS layer and has an arch shape or flat top surface, respectively.

Referring to FIG. 9a, a down-track cross-sectional perspective is shown along plane 44-44 in FIG. 5 or FIG. 6a. According to one embodiment, hot seed layer 17 and first 16-24 kG TS layer 24 each extend to height c of 50-600 nm from the ABS that is typically less than height h (300-800 nm) in the STS scheme. Here, the second 16-24 kG TS layer 25 extends to a backside 25e that is at height h from the ABS 30-30. The first 16-24 kG layer has a back portion previously described as BGC layer 24b with front side 24f that contacts a substantial portion of main pole trailing side 14t2. The second 16-24 kG TS layer also has a back portion hereafter referred to as BGC layer 25b with a front side 25f and contacts a top surface of BGC layer 24b at plane 45-45. A key feature is that front side 24f at height e is closer to the ABS than front side 25f in order to provide a shorter rise time (faster write speed) than in the STS configuration shown in FIG. 7a. Top surfaces of the second 16-24 kG TS layer 25 and BGC layer 25b are formed at plane 46-46 that is parallel to plane 45-45 and a down-track distance t2 therefrom. In embodiments where second 16-24 kG TS layer is comprised of a HD material, BGC layer 25b is also made of the HD material.

In the FTS configuration depicted in FIG. 9a, the PP3 trailing shield 27 has an arch shape with a recessed front side 27f that adjoins a top surface of the second 16-24 kG TS layer at side 27s1 that is on plane 46-46. The back end of the PP3 trailing shield adjoins a top surface 25t2 of BGC layer 25b at side 27s2 also on plane 46-46. Those skilled in the art will appreciate that BGC layers 24b, 25b form a back gap connection (BGC) between the PP3 trailing shield and main pole trailing side 14t2. Driving coils 21a, 21b and bucking coils 8 (1+1+2T scheme) are retained from the STS configuration. In the exemplary embodiment, driving coil 21a is formed between backside 25e of the second 16-24 kG TS layer and the front side 25f of BGC layer 25b. There is a dielectric layer 19 between backside 24e and front side 24f and below plane 45-45. Besides faster write speed, the FTS configuration in FIG. 9a is expected to have better BER because of a greater down-track distance between the second 16-24 kG TS layer and main pole trailing side 14t2 than the write gap thickness a behind end 17e1 in the STS configuration (FIG. 7b). Thus, dielectric layer 19 has a greater down-track thickness between plane 45-45 and main pole trailing side 14t2 in the FTS design than the write gap thickness in the STS configuration. The leading loop is also retained from the previous embodiment depicted in FIG. 7a. However, other leading loop schemes shown in FIG. 8b, FIG. 8c, or a non-DWS configuration may be used, instead.

Figure 9B:
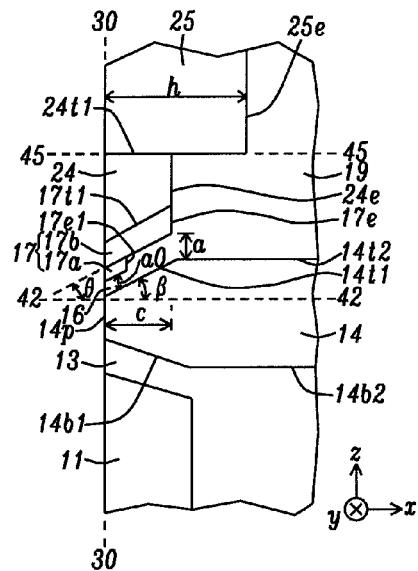
FIG. 9b is an enlargement of a portion of the shield structure in FIG. 9a that is proximate to the main pole and ABS.

In FIG. 9b, an enlarged view of the trailing shield structure that is proximate to the ABS 30-30 in FIG. 9a is illustrated. Tapered main pole leading side 14b1 has a front end at the ABS and is separated from leading shield 11 by lead gap 13. Hot seed layer 17 with upper portion 17b and lower portion 17a was previously described in the first embodiment. Backside 17e on upper portion 17b is coplanar with first 16-24 kG TS layer backside 24e at height c that is less than height h of the second 16-24 kG TS layer backside 25e. Write gap 16 (behind lower portion 17a) may have a uniform down-track thickness a between tapered main pole trailing side 14t1 and the hot seed layer at the ABS and up to height c when top side 17t has the same taper angle as main pole trailing side 14t1. As explained earlier, top and bottom surfaces of upper portion 17b may have a greater taper angle θ than taper angle β of trailing side 14t1. The first 16-24 kG TS layer 24 has a trailing side 24t1 that is at plane 45-45 and with a front side at the ABS.

Figure 10:
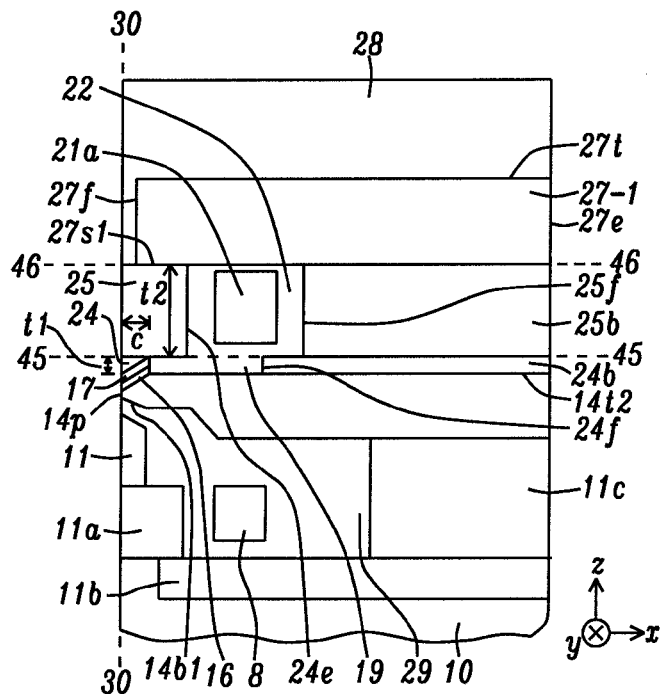

Referring to FIG. 10, an alternative FTS configuration is shown wherein the PP3 trailing shield 27 in FIG. 9a is replaced by PP3 trailing shield 27-1 with a flat top surface 27t described previously. Furthermore, a 1+1T coil scheme may be implemented as explained earlier with regard to FIG. 8. Top surface 27t is typically parallel to plane 46-46. PP3 trailing shield front side 27f is recessed from the ABS 30-30 and contacts a top surface of the second 16-24 kG TS layer 25 at side 27s1 on plane 46-46. The PP3 trailing shield adjoins BGC layer 25b at plane 46-46. All other aspects of the trailing shield structure comprising hot seed portions 17a, 17b, and TS layers 24, 25 in the first FTS configuration in FIGS. 9a-9b are retained in FIG. 10.

Figure 11:
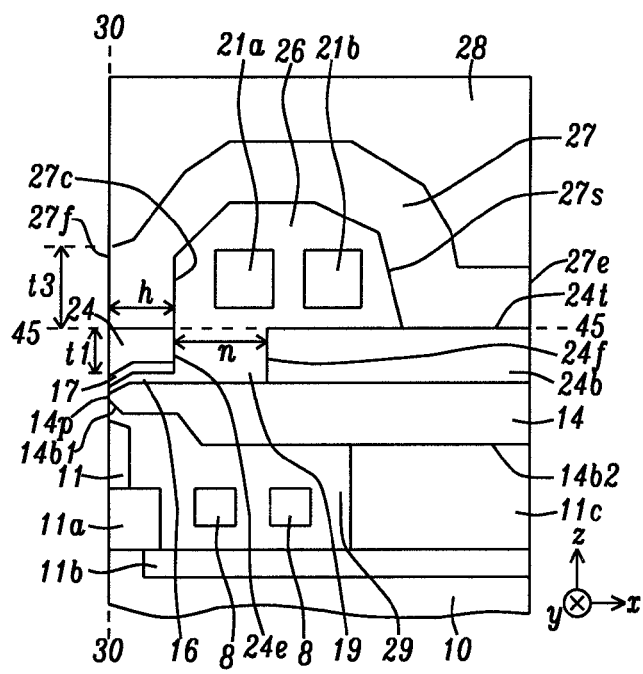
FIG. 11 and FIG. 12 are down-track cross-sectional views of two embodiments of the shield structure in FIG. 6b wherein a PP3 trailing shield is formed on the 16-24 kG layer at the ABS and has an arch shape above a 2+2T coil design and 1+1T coil design, respectively.

In a second embodiment of the FTS configuration shown in FIG. 11, the FTS scheme in FIG. 9a is modified by omitting the second 16-24 kG TS layer and by moving the PP3 trailing shield front side 27f to the ABS 30-30. Moreover, the backsides 17e, 24e of the hot seed layer 17 and first 16-24 kG TS layer 24, respectively, are moved back to height h. Note that a front portion of PP3 trailing shield 27 has a backside 27c at height h from front side 27f such that backside 27c is coplanar with backside 24e. The first 16-24 kG TS layer has a thickness t1 that is preferably 0.1 to 0.5 micron at the ABS while the PP3 trailing shield has a thickness t3 at the ABS where the combined thickness (t1+t3) equals about 1 micron. In the exemplary embodiment, BGC layer 24b also has a thickness t1. By moving front side 24f closer to the ABS than in the STS embodiment shown in FIG. 3, write speed is enhanced. To accommodate the short dielectric gap n in dielectric layer 19 between front side 24f and backside 24e, driving coil 21a is shifted above plane 45-45 so that both coils 21a, 21b are an equal down-track distance from main pole trailing side 14t2 and form a 2+2T coil scheme with bucking coils 8. Driving coils 21a, 21b are separated by dielectric layer 26 that is above plane 45-45 and between backside 27c and inner side 27s. Thus, a front portion of PP3 trailing shield 27 contacts 16-24 kG TS layer 24 at the ABS, and a back portion of the PP3 trailing shield adjoins BGC layer 24b at plane 45-45. An enlarged view of the region around write pole tip 14p is not shown but is essentially the same as illustrated for the STS embodiment in FIG. 7b where the hot seed layer has an upper portion 17b and lower portion 17a.

Figure 12:
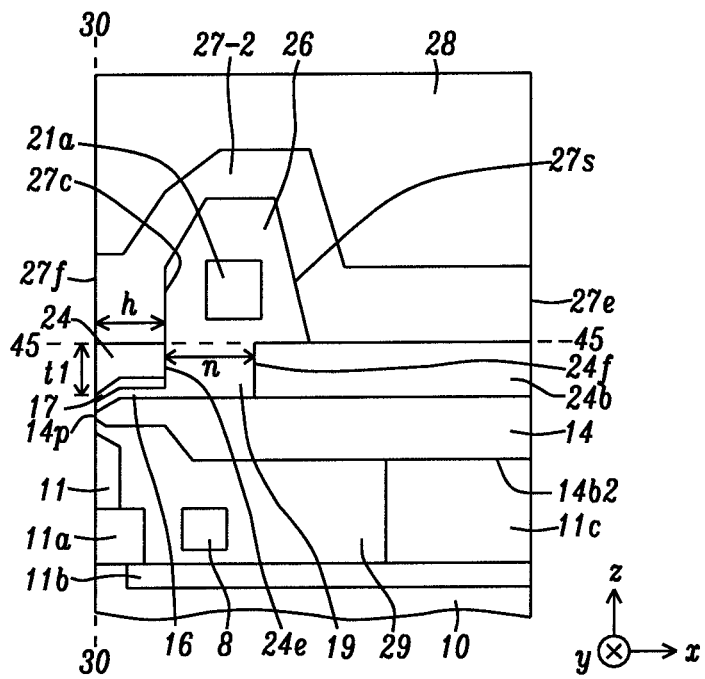

Referring to FIG. 12, another FTS configuration is depicted wherein the FTS scheme from FIG. 11 is retained except for the PP3 trailing shield with an arch (dome) shape. Although a 1+1T coil design is depicted with a single driving coil 21a between back side 27c and a back end 27e above BGC layer 24b at plane 45-45, other coil schemes may be incorporated in the write head as indicated earlier. Gap n in dielectric layer 19 between backside 24e and front side 24f is maintained from the previous embodiment. However, inner side 27s is shifted closer to the ABS so that the volume of dielectric layer 26 between PP3 trailing shield 27-2 and plane 45-45 is reduced. It should be understood that other leading loop schemes may be employed in the FIG. 11 and FIG. 12 embodiments. For example, the leading loop design depicted in FIG. 8b or FIG. 8c, or a non-DWS configuration that was previously described may be selected.

The present disclosure also encompasses a method of forming a PMR writer having an AWA shield design disclosed herein as depicted in FIGS. 13-19 that relate to process steps from leading shield formation to trailing shield deposition. The remainder of the fabrication sequence before leading shield formation and after trailing shield deposition comprises conventional steps that are well known in the art and are not described herein.

Figure 13:
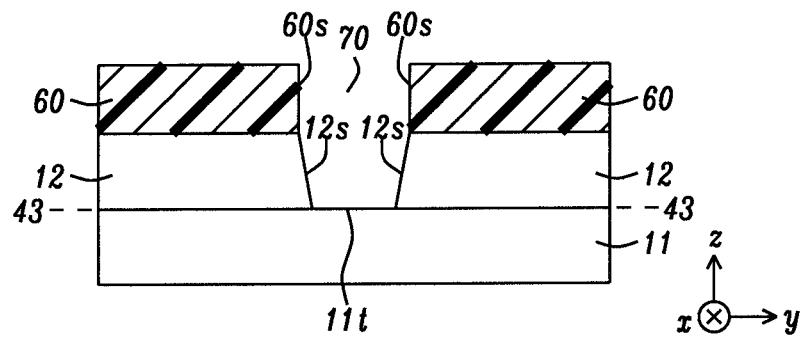
FIGS. 13-14, and FIGS. 16-17 are ABS views showing a sequence of steps where a 16-24 kG trailing shield layer with less than a full width is formed on a hot seed layer, and an 8-16 kG TS layer is formed adjacent to the 16-24 kG TS layer.

Referring to FIG. 13, a side shield layer 12 is plated on a leading shield 11. Then a photoresist layer 60 is coated on the side shield and is patterned by a photolithography method to form an opening 70 with sides 60s therein corresponding to the desired shape of the main pole layer. The opening is transferred through the side shield layer by a standard ion beam etching (IBE) or reactive ion etching (RIE) process and stops on top surface 11t of the leading shield at plane 43-43. The opening is formed between sides 12s and has a bottom surface at leading shield top surface 11t. In the exemplary embodiment, sides 12s are not orthogonal to plane 43-43 so that the cross-track distance between sides 60s is greater than the cross-track width of the exposed portion of top surface 11t.

Figure 14:
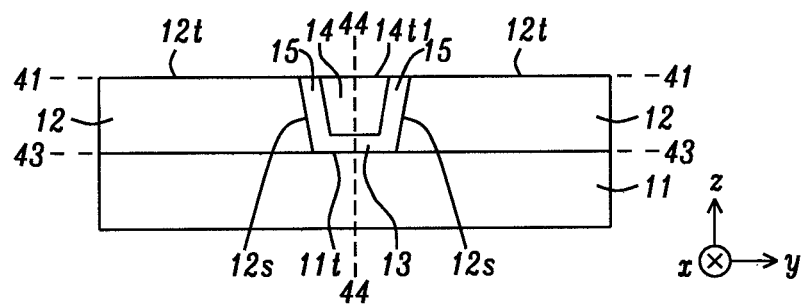

Referring to FIG. 14, a gap layer is preferably conformally deposited with a thickness of about 20 to 50 nm on the exposed portion of top surface 11t, and sides 12s, to partially fill the opening 70. The gap layer becomes the leading gap and side gap layers after subsequent processing. It should be understood that the gap layer may be a stack of layers including a lower alumina layer contacting sides 12s and top surface 11t, and an upper Ru layer or another metal layer disposed on the alumina layer. Next, the main pole including write pole tip 14 at the ABS is electroplated to fill opening 70, and a chemical mechanical polish (CMP) process is employed to remove photoresist layer 60 and any material above plane 41-41. The CMP process forms top surface 12t of side shield layers 12 that is coplanar with main pole trailing side 14t at plane 41-41. Side portions of the gap layer become side gaps 15, and a bottom portion is now shown as leading gap 13. In some embodiments, ion milling may be used at this point to form a taper on the main pole trailing side by a process sequence well known to those skilled in the art.

Figure 15:
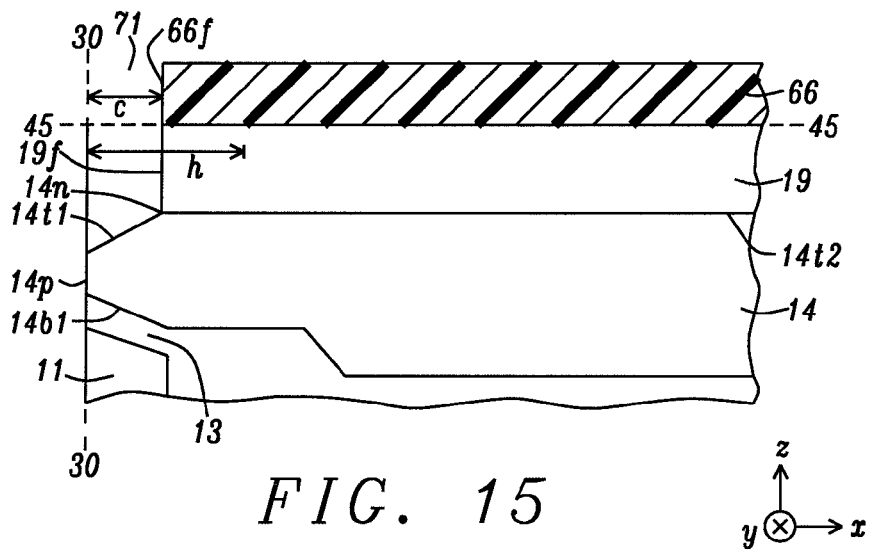
FIG. 15 and FIGS. 18-19 are down-track cross-sectional views showing a sequence of steps where a 16-24 kG TS layer with less than a full width is formed on a hot seed layer, and an 8-16 kG TS layer is formed adjacent to the 16-24 kG TS layer.

Referring to FIG. 15 with a down-track cross-sectional view along plane 44-44 in FIG. 14, dielectric layer 19 is deposited on the tapered main pole trailing side 14t1, and on a main pole trailing side 14t2 that remains orthogonal to the eventual ABS hereafter referred to as plane 30-30. It should be understood that the ABS is formed by a lapping process after all layers in the write head are laid down at a back end of the fabrication sequence. Then, a second photoresist layer 66 is coated on the dielectric layer and is patterned by a conventional method to form opening 71 between plane 30-30 and front side 66f of the second photoresist layer. In one embodiment that involves fabrication of the FTS configuration in FIG. 9a or FIG. 10, the height of the opening is c. In other embodiments comprising the fabrication of STS configurations in FIG. 7a and FIG. 8, or the FTS configurations in FIGS. 11-12, the opening may extend over the main pole trailing side 14t2 to height h. Next, a RIE or IBE process is performed to transfer opening 71 through the dielectric layer and stop on trailing side 14t1 for embodiments with height c, or ending on trailing sides 14t1, 14t2 when height h is desired. Corner 14n is the point where the two main pole trailing sides intersect.

Figure 16:
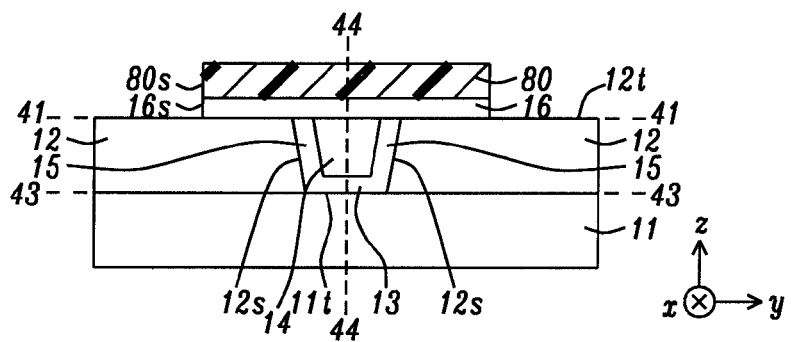

With regard to FIG. 16, the write gap 16 is deposited on a substrate comprised of top surfaces 12t, and 14t1 in opening 71 with height c, or alternatively on surfaces 12t, 14t1, 14t2 in an opening with height h (not shown). Thereafter, a third photoresist layer is coated on the write gap and is patterned with a photolithography method to form photoresist island 80 with sides 80s that are separated by cross-track width w at the eventual ABS. Then, an IBE or RIE step is employed to transfer the shape of the third photoresist layer through the write gap to generate sides 16s that are essentially coplanar with sides 80s and substantially orthogonal to top surface 12t at the ABS. The IBE or RIE step exposes portions of top surface 12t on each side of center plane 44-44. Unlike the process of record where the write gap and hot seed layer are simultaneously etched to form cross-track width w in FIG. 2, this embodiment avoids hot seed layer etching and thereby substantially reduces undesirable etching into top surface 12t at plane 41-41.

Figure 17:
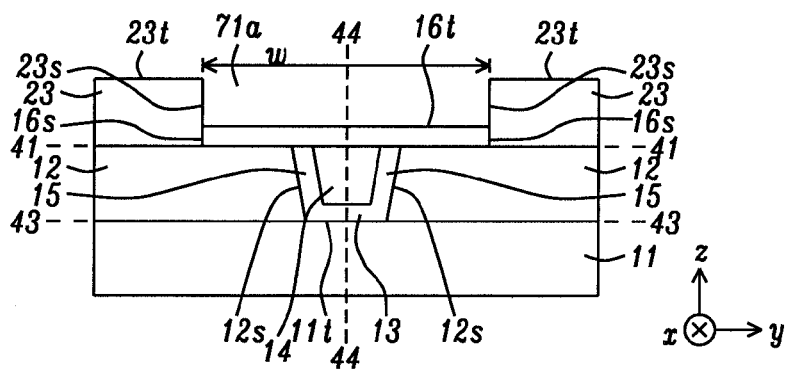

The partially formed AWA shield structure in FIG. 16 is shown in FIG. 17 after the 8-16 kG trailing shield (TS) layer 23 is plated on uncovered portions of side shields 12 and adjoins sides 16s. A far side of each 8-16 kG TS layer coincides with a far side 60 or 61 of the trailing shield structure. The third photoresist layer is stripped to leave an opening 71a above write gap trailing side 16t and between inner sides 23s of 8-16 kG TS layers 23.

Figure 18:
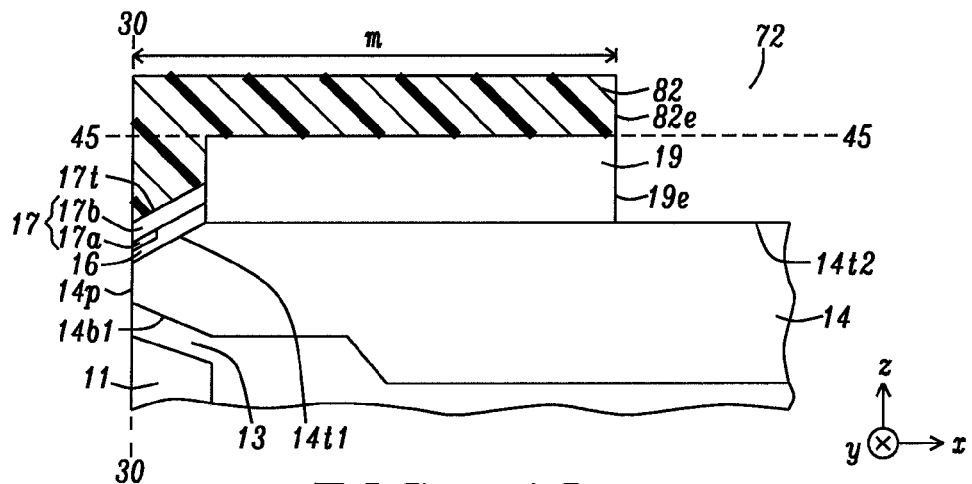

Referring to FIG. 18, a RIE or IBE process is used to form the desired shape of hot seed lower portion 17a in the write gap 16 at the ABS. Furthermore, the aforementioned etch may include an angled etch to form a larger taper angle on the write gap layer top surface (corresponding to angle θ in FIG. 7b). Thus, the taper angle θ may be enlarged from approximately 25 degrees to a value that is within the range of 30-70 degrees. Next, the hot seed layer comprised of lower portion 17a and upper portion 17b is plated in opening 71a. In the following step, another photoresist layer 82 is coated on dielectric layer 19 and on the hot seed layer. The photoresist layer is patterned to form opening 72 behind backside 82e that is at height m from plane 30-30. An etch process is employed to transfer the opening through the dielectric layer and stops on main pole trailing side 14t2 thereby forming backside 19e on the dielectric layer.

Figure 19:
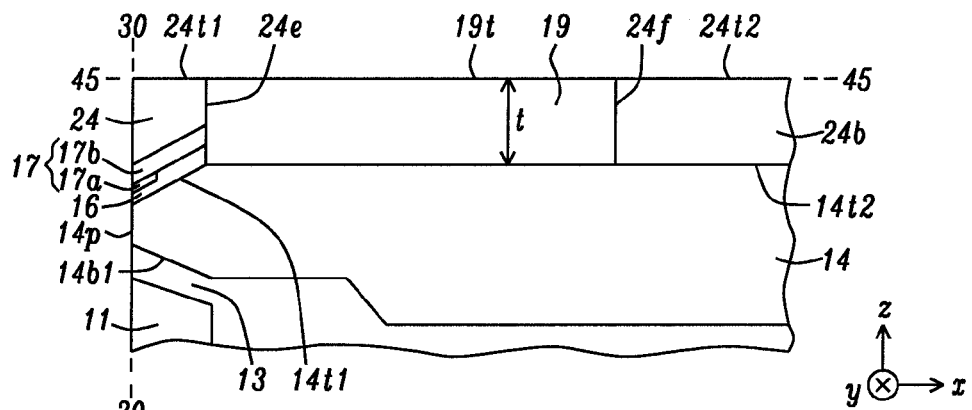

Referring to FIG. 19, the patterned photoresist layer 82 is stripped by a conventional method. Next, a 16-24 kG layer is plated on hot seed layer 17 to form 16-24 kG TS layer 24, and on exposed portions of main pole trailing side 14t2 to form BGC layer 24b. A CMP process is performed to form top surface 24t1 on 16-24 kG TS layer 24, top surface 19t on the dielectric layer, and top surface 24t2 on BGC layer 24b. All of the aforementioned top surfaces are formed at plane 45-45. Note that backside 24e coincides with front side 19f (shown in FIG. 15), and front side 24f coincides with backside 19e of dielectric layer 19 in FIG. 18. In the exemplary embodiment, the CMP process stops to provide a thickness t of about 1 micron in dielectric layer 19, BGC layer 24b, and in 16-24 kG TS layer 24 at the ABS. However, in other embodiments involving the fabrication of FTS configurations, the CMP process may be lengthened so that the thickness of the aforementioned layers is further reduced to t1 in the range of 0.1 to 0.5 micron.

Subsequently, driving coil 21 is formed in dielectric layer 19, and the PP3 trailing shield 27 is plated on the top surfaces of the 16-24 kG TS layer proximate to the ABS, and on the BGC layer 24b to form the STS configuration shown in FIG. 7a and FIG. 8a.

In an alternative FTS embodiment where front side of the BGC layer 24b is moved closer to the ABS, dielectric layer 26 is formed on top surfaces of the 16-24 kG TS layer and BGC layer 24b, and then driving coils 21a, 21b or only driving coil 21a is formed in dielectric layer 26 prior to plating PP3 trailing shield 27, or 27-2, with a front side at the ABS 30-30, respectively, as previously described with regard to trailing shield structures shown in FIG. 11 and FIG. 12.

Figure 20:
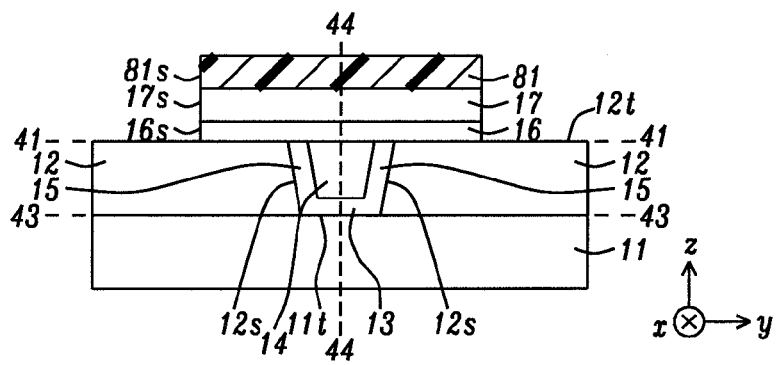
FIGS. 20-21 are ABS views that depict an alternative process embodiment of the present disclosure wherein the write gap and hot seed layer are formed with a cross-track width before the 8-16 kG TS layer is plated.
Figure 21:
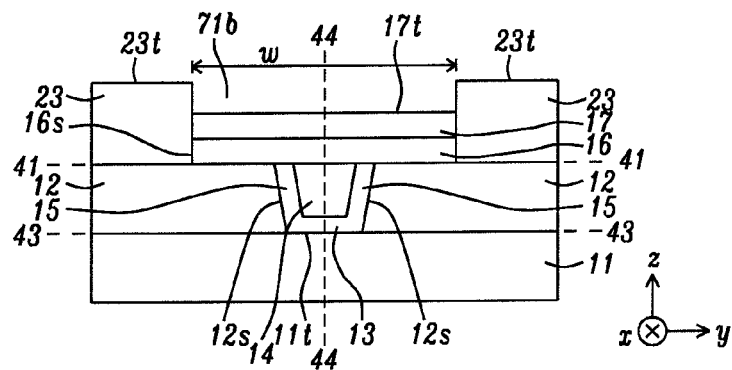

In another embodiment, the fabrication process flow represented by FIGS. 13-19 may be followed through formation of opening 71 in FIG. 15. Then, as shown in FIG. 20, the write gap 16 and hot seed layer 17 may be sequentially deposited at plane 41-41 before photoresist layer 81 is coated and patterned to generate the photoresist mask with sides 81s. A RIE or IBE process is employed to form sides 16s, 17s on the write gap and hot seed layer, respectively.

In the next step shown in FIG. 21, 8-16 kG TS layer 23 is plated on exposed surfaces of side shield layers 12 at plane 41-41. The photoresist layer is removed to leave a top surface 17t of the hot seed layer exposed within opening 71b.

At this point, the process steps shown in FIG. 18 and FIG. 19 are performed to yield the STS trailing shield configurations described earlier with respect to FIG. 7a and FIG. 8, or the FTS TS configurations depicted in FIG. 11 and FIG. 12.

Figure 22:
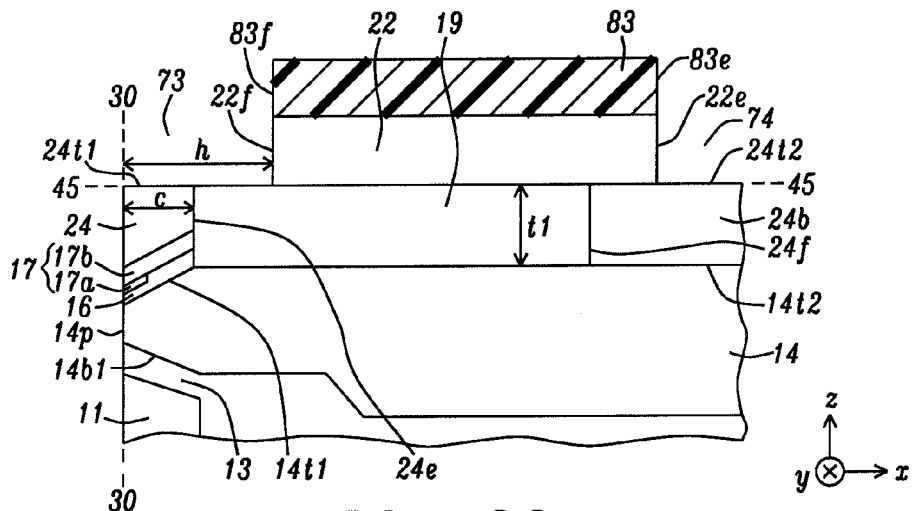
FIGS. 22-23 are down-track cross-sectional views depicting a sequence of steps in an embodiment of the present disclosure wherein a second 16-24 kG TS layer is formed on a first 16-24 kG TS layer.
Figure 23:
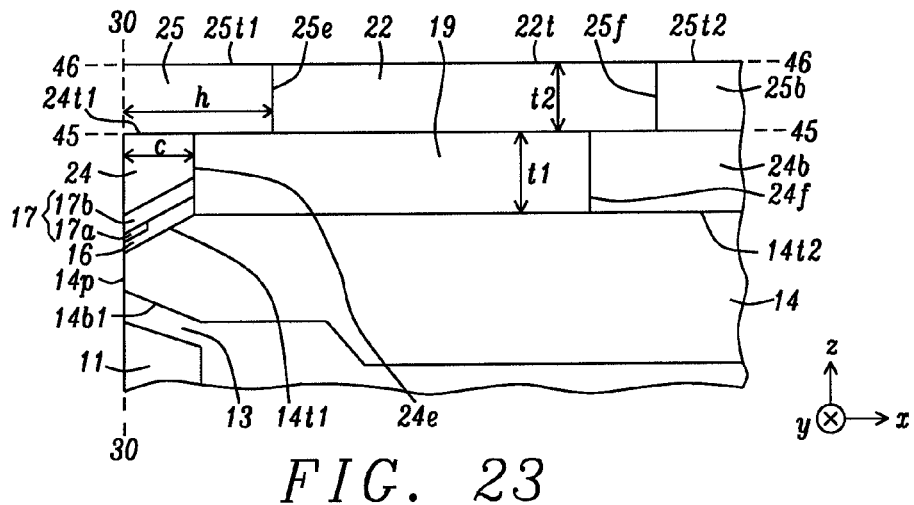
Figure 24:
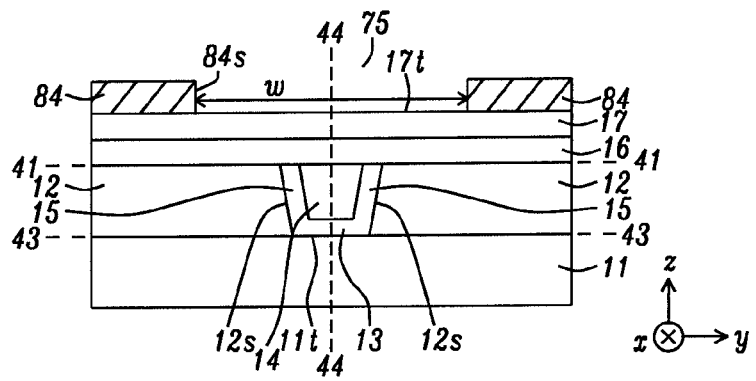
FIGS. 24-28 are ABS views illustrating the fabrication of an alternative AWA shield structure wherein outer portions of the side shield top surface are formed below a plane that includes an inner portion of the side shield top surface that contacts the write gap.

In order to manufacture the FTS trailing shield configurations illustrated in FIG. 9a and FIG. 10, the process flow continues from FIG. 19 in the previous paragraph with the process steps shown in FIG. 22 and FIG. 23.

Referring to FIG. 22, the second dielectric layer 22 is deposited on top surface 19t of the dielectric layer 19, top surface 24t1 of the 16-24 kG TS layer 24, and on top surface 24t2 of BGC layer 24b with thickness t1. A photoresist layer 83 is coated on the second dielectric layer and patterned to form opening 73 with height h at the ABS above top surface 24t1, and opening 74 above top surface 24t2. A backside 22e of the second dielectric layer is a greater distance from the ABS 30-30 than front side 24f of BGC layer 24b. A RIE or IBE process is then performed to transfer opening 73 and opening 74 through portions of dielectric layer 22 that are not protected by photoresist layer 83, and stops at plane 45-45 thereby exposing top surface 24t1 on 16-24 kG TS layer 24, and top surface 24t2 on BGC layer 24b. Front side 22f and back side 22e of the second dielectric layer are formed in openings 73, 74, respectively.

In FIG. 23, the partially formed trailing shield structure is shown after the second 16-24 kG layer is plated to provide TS layer 25 and BGC layer 25b that fill openings 73, 74, respectively, and have thickness t2. Another CMP process is employed to form top surface 25t1 on 16-24 kG TS layer 25, top surface 22t on the second dielectric layer, and top surface 25t2 on BGC layer 25b at plane 46-46 that is parallel to plane 45-45. Backside 25e on 16-24 kG TS layer 25 coincides with front side 22f mentioned previously, and front side 25f on BGC layer 25b coincides with backside 22e on the second dielectric layer. Thereafter, conventional methods are followed to form the remainder of the write head including driving coil 21a in dielectric layer 22, and the PP3 trailing shield 27 or 27-1 with front end 27f that is recessed from the ABS as shown in FIG. 9a or FIG. 10, respectively.

In another process embodiment of the present disclosure, the process flow depicted in FIGS. 13-19 is modified after the step shown in FIG. 15. In particular, the process flow continues with the partially formed trailing shield structure illustrated in FIG. 24 after write gap 16 and hot seed layer 17 are sequentially deposited at plane 41-41 at the ABS. Next, a photoresist layer 84 is coated on the hot seed layer and is patterned by a photolithography method to generate opening 75 having cross-track width w that is bisected by center plane 44-44, and uncovers a portion of the hot seed layer top surface 17t.

Figure 25:
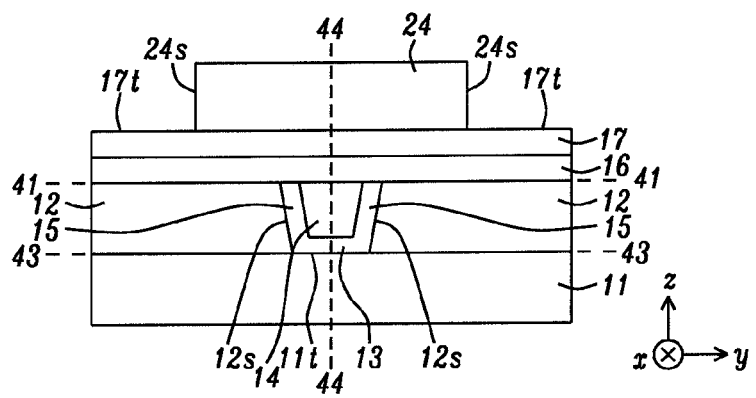

Referring to FIG. 25, the 16-24 kG TS layer 24 is plated in opening 75. In the following step, photoresist layer 84 is removed to leave 16-24 kG TS layer sides 24s on each side of center plane 44-44. Portions of hot seed layer top surface 17t adjoining the sides 24s are uncovered.

Figure 26:
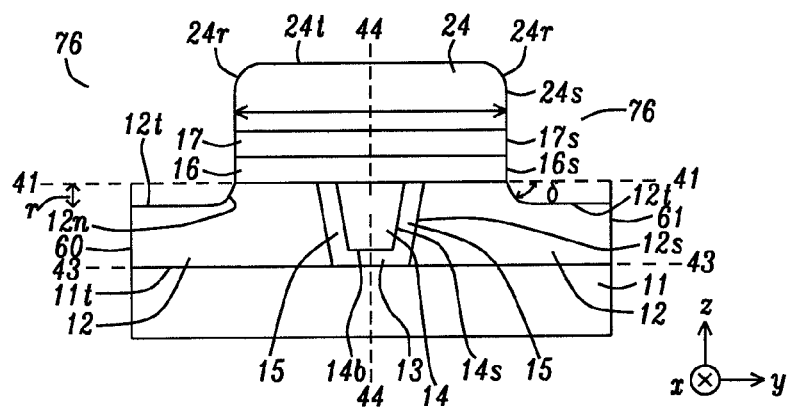

In FIG. 26, the partially formed trailing shield structure is shown after a RIE or IBE process is performed that removes portions of hot seed layer 17 and write gap 16 that are not protected by the 16-24 kG TS layer 24. As a result, openings 76 are formed at sides 16s, 17s, 24s, and rounded corners 24r are formed at either end of top surface 24t1. Moreover, the etching process typically removes a top portion of side shields 12 below plane 41-41 thereby generating a side shield side 12n on either side of center plane 44-44 where side 12n intersects plane 41-41 at write gap side 16s and forms an angle δ of 20 to 60 degrees with plane 41-41. Side shield top surface 12t is now a distance r below plane 41-41 and connects with an end of side 12n that is opposite to the end at plane 41-41. Thus, distance r varies from a minimum of 0 nm where side 12n intersects the write gap side to a maximum of 20 to 100 nm at a far side 60 (or 61) of the side shield.

Figure 27:
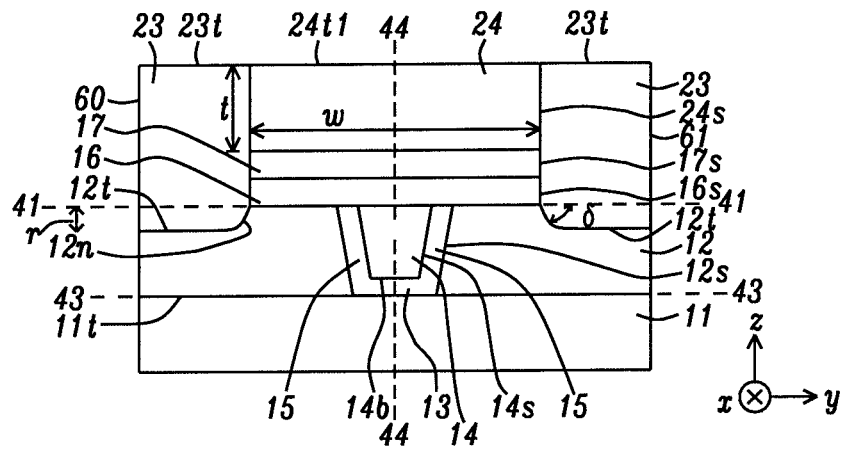
Figure 28:
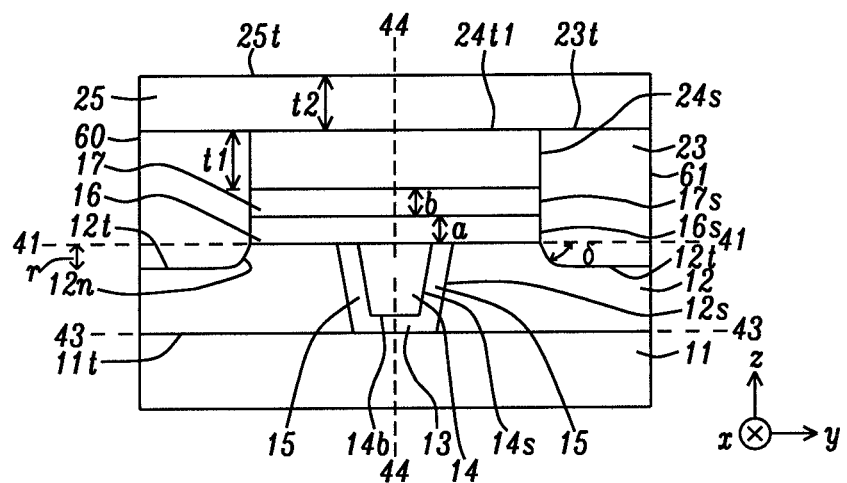

Referring to FIG. 27, the 8-16 kG TS layer 23 is plated on side shield top surfaces 12t and sides 12n to a level that fills opening 76 on each side of center plane 44-44. A CMP process is used for planarization so that top surface 23t of the 8-16 kG TS layer, and top surface 24t1 of the 16-24 kG TS layer are coplanar, and rounded corners 24r are removed. In the exemplary embodiment, the CMP process results in a thickness t of about 1 micron for the 16-24 kG TS layer 24. However, the present disclosure also anticipates that a reduced thickness t1 of about 0.1 to 0.5 micron could be an alternative outcome for the CMP process. Each 8-16 TS layer 23 has a thickness equal to (r+a+b+t) as shown in FIG. 27 or (r+a+b+t1) in FIG. 28.

In embodiments where the 16-24 kG TS layer 24 has thickness t1, a second 16-24 kG TS layer 25 may be formed on the top surface 23t of the 8-16 kG TS layer, and on top surface 24t1 of the first 16-24 kG TS layer 24. The second 16-24 kG TS layer preferably has a full width between trailing shield sides 60, 61, and has thickness t2 where (t1+t2) equals about 1 micron as explained previously. Although this embodiment is expected to cause an increase in WATE because of more topography in the side shields 12 in that side 12n is not coplanar with top surface 12t, the fact that both side shields 12 and 8-16 kG TS layer 23 are made of the same magnetic material substantially mitigates the effect on WATE.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
    (a) a main pole with a leading side and a trailing side at an air bearing surface (ABS), and two sides that connect the leading side and trailing side and are formed equidistant from a center plane that is orthogonal to the ABS;
    (b) a gap layer surrounding the main pole at the ABS and having a write gap with a bottom surface that contacts the trailing side at a first plane that is orthogonal to the center plane and ABS, and has a top surface, the write gap has a first cross-track width between a first side and second side each having an end at the first plane and formed equidistant from the center plane; and
    (c) a trailing shield structure, comprising;
    (1) a (hot seed) magnetic layer having a saturation magnetic moment in a range of 19-24 kiloGauss (kG) adjoining the write gap top surface, and having the first cross-track width between two sides that are equidistant from the center plane, the hot seed magnetic layer extends from the ABS to a backside that is a first height from the ABS;
    (2) a first magnetic layer with a saturation magnetic moment in a range of 16-24 kG and having a first down-track thickness (t1) at the ABS, and a bottom surface with the first cross-track width between two sides formed equidistant from the center plane, and that adjoins a top surface of the hot seed magnetic layer, and extends to a back side that is at the first height from the ABS; and
    (3) a second magnetic layer with a saturation magnetic moment in a range of 8-16 kG that contacts the sides of the hot seed magnetic layer, first magnetic layer, and write gap on each side of the center plane, has a top surface formed coplanar with a top surface of the first magnetic layer, and has a bottom surface at the first plane.

2. The PMR writer of claim 1 wherein each of the sides of the first magnetic layer form an angle with respect to the bottom surface thereof such that the top surface of the first magnetic layer has a cross-track width that is essentially equal to or greater than the first cross-track width.

3. The PMR writer of claim 1 wherein the trailing shield structure further comprises a PP3 trailing shield with a front side that is either recessed from the ABS or exposed to ABS, and contacts the top surface of the first magnetic layer at a second plane formed parallel to the first plane, and having a back end that contacts a top surface of a back gap connection at the second plane.

4. The PMR writer of claim 3 wherein the back gap connection is comprised of a magnetic layer having a saturation magnetic moment in a range of 16-24 kG that has the first down-track thickness between a top surface at the second plane and a bottom surface at a trailing side of the main pole that is aligned orthogonal to the ABS.

5. The PMR writer of claim 4 wherein the first down-track thickness is about 1 micron.

6. The PMR writer of claim 1 wherein the first down-track thickness is about 0.1 to 0.5 micron, and the trailing shield structure further comprises a second magnetic layer having a saturation magnetic moment in a range of 16-24 kG, and with a second down-track thickness (t2) at the ABS where (t1+t2) is about 1 micron, and having a backside at a second height greater than the first height, the second magnetic layer with a 16-24 kG saturation magnetic moment contacts the top surface of the first magnetic layer at a second plane that is orthogonal to the ABS, and has a cross-track width greater than the first cross-track width.

7. The PMR writer of claim 6 wherein the trailing shield structure further comprises a PP3 trailing shield with a front side that is recessed from the ABS, and contacts a top surface of the second magnetic layer with a 16-24 kG saturation magnetic moment at a third plane formed parallel to the second plane, and having a back end that contacts a top surface of a back gap connection at the third plane.

8. The PMR writer of claim 7 wherein the back gap connection comprises an upper layer that is made of a magnetic material with a 16-24 kG saturation magnetic moment and having a top surface at the third plane, and a lower layer made of a magnetic material with a 16-24 kG saturation magnetic moment and having a top surface at the second plane.

9. The PMR writer of claim 8 wherein a front side of the lower layer in the back gap connection is a lesser height from the ABS than a front side of the upper layer in the back gap connection.

10. The PMR writer of claim 8 wherein one or more of the second magnetic layer with an 8-16 kG saturation magnetic moment, first and second magnetic layers in the trailing shield with a 16-24 kG saturation magnetic moment, back gap connection, and PP3 trailing shield are made of an alloy having a damping parameter α of ≥0.04 that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

11. The PMR writer of claim 10 wherein the gap layer further comprises a side gap that contacts each side of the main pole, and a lead gap that contacts the main pole leading side, and wherein the PMR writer is further comprised of a side shield that adjoins the side gap on each side of the center plane, and a leading shield that adjoins the leading gap, each side shield has a top surface that adjoins the bottom surface of the second magnetic layer with a 8-16 kG saturation magnetic moment at the first plane.

12. The PMR writer of claim 11 wherein the side shields and the leading shield are comprised of an alloy having a damping parameter α of ≥0.04, and that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

13. The PMR writer of claim 6 wherein the second magnetic layer with a 16-24 kG saturation magnetic moment is a PP3 trailing shield layer that extends to a back end which contacts a top surface of a back gap connection.

14. A perpendicular magnetic recording (PMR) writer, comprising:
  (a) a main pole with a leading side and a trailing side at an air bearing surface (ABS), and two sides that connect the leading side and trailing side and are formed equidistant from a center plane that is orthogonal to the ABS, the leading side adjoins a lead gap at the ABS and the trailing side adjoins a write gap at the ABS;
  (b) a gap layer surrounding the main pole, the gap layer includes the lead gap, the write gap having a bottom surface at a first plane at the ABS and a first cross-track width, and a side gap which contacts one of the main pole sides on each side of the center plane; and
  (c) an all wrap around (AWA) shield structure, comprising:
    (1) a (hot seed) magnetic layer with a 19-24 kG saturation magnetic moment adjoining a top surface of the write gap, and having the first cross-track width between two sides that are equidistant from the center plane, the hot seed magnetic layer extends from the ABS to a backside that is a first height from the ABS;
    (2) a first magnetic layer with a 16-24 kG saturation magnetic moment and having a first down-track thickness (t1) at the ABS, and a bottom surface with the first cross-track width between two sides formed equidistant from the center plane, and that adjoins a top surface of the hot seed magnetic layer, and extends to a backside that is at the first height from the ABS;
    (3) a second magnetic layer with an 8-16 kG saturation magnetic moment that contacts the sides of the hot seed magnetic layer, the first magnetic layer, and write gap on each side of the center plane, has a top surface formed coplanar with a top surface of the first magnetic layer, and has a bottom surface at the first plane;
    (4) a side shield that adjoins each side gap, and having a top surface that contacts the second magnetic layer at the first plane; and
    (5) a leading shield that adjoins the leading gap, and contacts a bottom surface of each side shield.

15. The PMR writer of claim 14 wherein the sides of the first magnetic layer each form an angle with respect to the bottom surface thereof such that the top surface of the first magnetic layer has a cross-track width that is essentially equal to or greater than the first cross-track width.

16. The PMR writer of claim 14 wherein the PMR writer further comprises a PP3 trailing shield with a front side that is either recessed from the ABS or exposed to ABS, and contacts a top surface of the first magnetic layer at a second plane that is parallel to the first plane, and having a back end that contacts a top surface of a back gap connection.

17. The PMR writer of claim 16 wherein the back gap connection is comprised of a magnetic layer with a 16-24 kG saturation magnetic moment and has the first down-track thickness between a top surface at the second plane and a bottom surface at a trailing side of the main pole that is aligned orthogonal to the ABS.

18. The PMR writer of claim 17 wherein the first down-track thickness is about 1 micron, and the PP3 trailing shield back end contacts the top surface of the magnetic layer with a 16-24 kG saturation magnetic moment in the back gap connection at the second plane.

19. The PMR writer of claim 14 wherein the first down-track thickness is about 0.1 to 0.5 micron, and the trailing shield structure further comprises a second magnetic layer having a 16-24 kG saturation magnetic moment and with a second down-track thickness (t2) at the ABS where (t1+t2) is about 1 micron, and has a backside at a second height greater than the first height, the second magnetic layer with a 16-24 kG saturation magnetic moment has a cross-track width greater than the first cross-track width, and contacts the top surface of the first magnetic layer at a second plane that is orthogonal to the ABS.

20. The PMR writer of claim 19 wherein the trailing shield structure further comprises a PP3 trailing shield with a front side that is recessed from the ABS and contacts a top surface of the second magnetic layer with a 16-24 kG saturation magnetic moment, and having a back end that contacts a top surface of a back gap connection.

21. The PMR writer of claim 20 wherein the back gap connection comprises an upper layer that is made of a magnetic material with a 16-24 kG saturation magnetic moment and having a top surface that is at a third plane that includes a top surface of the second magnetic layer with a 16-24 kG saturation magnetic moment, and a lower layer made of a magnetic material with a 16-24 kG saturation magnetic moment and having a top surface at the second plane.

22. The PMR writer of claim 21 wherein a front side of the lower layer in the back gap connection is a lesser height from the ABS than a front side of the upper layer in the back gap connection.

23. The PMR writer of claim 21 wherein one or more of the second magnetic layer, first and second magnetic layers with a 16-24 kG saturation magnetic moment in the trailing shield, PP3 trailing shield, back gap connection, side shields, and leading shield are comprised of an alloy having a damping parameter α of ≥0.04, and that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 1 to 15 atomic % in the alloy.

24. The PMR writer of claim 19 wherein the second magnetic layer with a 16-24 kG saturation magnetic moment is a PP3 trailing shield layer that extends to a back end which contacts a top surface of a back gap connection.

25. The PMR writer of claim 14 wherein the leading shield is part of a leading magnetic loop that comprises a leading shield connection (LSC) layer, which is magnetically connected to a leading side of the leading shield.

* * * * *